United States Patent [19]

Tozo

[11] 4,051,606
[45] Oct. 4, 1977

[54] SELF-LEARNING APPARATUS FOR READING AND WRITING OF THE JAPANESE LANGUAGE

[76] Inventor: Nakamura Tozo, No. 32-3, 3-Chome, Kugahara, Ota, Tokyo, Japan, 146

[21] Appl. No.: 652,147

[22] Filed: Jan. 26, 1976

[30] Foreign Application Priority Data

Feb. 12, 1975 Japan ................................ 50-16893

[51] Int. Cl.² .............................................. G09B 5/04
[52] U.S. Cl. ........................................ 35/35 C; 35/5; 197/1 A
[58] Field of Search ................ 35/35 C, 5, 6; 197/1 A

[56] References Cited

U.S. PATENT DOCUMENTS

| 1,549,621 | 8/1925 | Stickney | 197/1 A X |
| 1,600,494 | 9/1926 | Stickney | 197/1 A X |
| 3,112,569 | 12/1963 | Moore et al. | 35/5 |
| 3,136,072 | 6/1964 | Ross | 35/5 |

Primary Examiner—William H. Grieb
Attorney, Agent, or Firm—Toren, McGeady and Stanger

[57] ABSTRACT

A self-learning apparatus for reading (pronouncing) and writing (typing) of the Japanese language is provided in combination with a device for audibly learning pronunciation of the Japanese language from hearing of its sounds manually reproduced on the device. A device for automatically identifying vocal cords vibrating sounds for vowls and consonants of the Japanese language provided thereto, and automatically typing identified vowls and consonants in the Japanese kana-letters by an electricmotor driven Japanese kana-letter typewriter, which can also be operated manually, therefore correctness or incorrectness of pronunciation of the Japanese language can be judged by comparing two Japanese kana-letters one of which is typed automatically and the another is typed manually.

7 Claims, 3 Drawing Figures

SELF-LEARNING APPARATUS FOR READING AND WRITING OF THE JAPANESE LANGUAGE

BACKGROUND OF THE INVENTION

1. Field of the Invention

The present invention relates to a self-learning apparatus for reading (pronouncing) and writing (typing) of the Japanese language and particularly to an apparatus for helping non-Japanese to lear pronunciation of the Japanese language, and typing of the Japanese language in Japanese kana-letters, as well as to judge correctness or incorrectness of the pronunciation by the learner oneself.

2. Description of the Prior Art

The Japanese language comprises sixty eight sounds composed of vocal cord vibrations, i.e.;

1. Five "vocal-cord-vibration"sounds which correspond to the five vowels A, I, U, E and O of the English language respectively, and are distinguishable from each other;

2. Forty five vocal-cord vibration sounds which are produced by incorporation nine voiceless consonants K, S, T, N, H, M, Y, R and W of the English language the respective five vowels and are distinguishable to each other;

3. Twenty five vocal cords vibrating sounds which are produced by incorporation of five voiced consonants G, Z, D, B, and P of the English language with the respective five vowls, and are distinguishable from each other; and 4. One vocal-coard vibrating nasal sound "N" of the English language which is distinguishable from the other vocal cords vibrating sounds; as described in the following words table W.T.

|  | W.t.: |  |
|---|---|---|
| A I U E O | hereinafter called | A line (AL) |
| KA KI KU KE KO | " | KA line (KL) |
| SA SI SU SE SO | " | SA line (SL) |
| TA TI TU TE TO | " | TA line (TL) |
| NA NI NU NE NO | " | NA line (NL) |
| HA HI HU HE HO | " | HA line (HL) |
| MA MI MU ME MO | " | MA line (ML) |
| YA — YU — YO | " | YA line (YL) |
| RA RI RU RE RO | " | RA line (RL) |
| WA — — — — | " | WA line (WL) |
| GA GI GU GE GO | " | GA line (GL) |
| ZA ZI ZU ZE ZO | " | ZA line ZL) |
| DA — — DE DO | " | DA line (DL) |
| BA BI BU BE BO | " | BA line (BL) |
| PA PI PU PE PO | " | PA line (PL) |
| and N | | |

In the table, voiced sounds of the Japanese language, such as YI, YE belonging to the YA line; WI, WU, WE and WO belonging to the WA line and DI, DU belonging to the DA line are eliminated. This is so because they are practically indistinguishable in Japanese pronuciation, as well as in auditory sereception thereof, from that of voiced sounds, such as I, E, I, U, E, O, ZI and ZU of the table. They are shown by blank marks (-).

A Japanese language identifying apparatus which identifies the Japanese language according to its characteristic vocal-cord vibrating sounds and indicates the language by printing in the Japanese kana-letters (syllabic characters), has been described for example; in the specification of the Japanese Patent publication N0. 3640/1936, published on September 14, 1936.

Said known apparatus identifies one of vowels of the Japanese language according to difference of frequency components between the voiced sounds for the vowels and produces and impulse current for the identified vowel to operate a printer for said vowel. It identifies one of consonants of the Japanese language according to difference of frequency components between the voiced sounds for the consonants and produces an impulse current for the identified consonant to operate a printer for said consonant. Printers for the consonant operate on receiving both impulse currents for a consonant and a vowel, as described in this publication.

The present invention depends on the technique suggested in said known publication for identifying the Japanese language. A device embodied such technique will be called hereinafter as the Japanese language identifying device.

SUMMARY OF THE INVENTION

The apparatus of the present invention comprises; (a), a device to learn pronouncing manner audibly of the Japanese language described in the words table W.T from hearing of vocal cords vibrating sounds of the japanese language; (b), when desired, a device to learn wording audibly of a foreign language e.g; in the English, French or German language and a corresponding wording in the Japanese language, and to learn their translated relation; and (c), a Japanese language identifying device automatically identifies vocal cords vibrating sounds of the Japanese language pronounced by the learner, and automatically typing the identified language in the Japanese kana-letters; said device c is made also to be operated manually for typing the Japanese kana-letter same as that which are automatically identified and typed respectively, thereby correctness or incorrectness of the learner's pronunciation can be judged by the learner oneself by comparing two kana-letters, automatically identified and typed on the one hand, with that which is manually typed on the other hand.

Said device a comprises a magnetic-tape record player having recorded therein sixty eight vocal cords vibrating sounds assembled in their line order as indicated in the words table W.T, or about fourteen magnetic-tape record players having recorded therein said vocal cords vibrating sounds divided substantially into their line groups, and one push-button switch or fourteen push-button switchs connected in series with the player or players respectively. A mark "HEARING" is indicated (in the case of assembled reproduction) or marks AL, KL - - - PL and N (in the case of line groups reproduction) are indicated on the push-button switchs respectively, in order to faciliate push-button operation of the record player or players for learning of pronunciation of the Japanese language reproduced on the player or players, from hearing.

Said device b for learning translation of a foreign wording into the Japanese wording comprises a record player having recorded therein a wording of a foreign language and its translated wording in the Japanese language and an operating push-button switch. The device b is made preferably as a cassette-type tape-record player to use a replaceable recorded tape suitable for the learner.

Device c described above, comprises in comprises in combination a Japanese language identifier and an electric-motor-driver Japanese kana-leter typewriter electrically connected to the identifier.

Input vocal cords vibrating sounds of the Japanese language provided by the learner are automatically identified by said identifier, Japanese kana-letters will be automatically typed successively, according to the identification for the vocal cords vibrating sounds. Japanese kana-letters same with that which are automatically identified and typed can also be typed by the typewriter by its manual operation, therefore, by comparing two Japanese kana-letters which must be just same in their characters, unless the lerner's pronunciation was incorrect, correctness or incorrectness of the pronunciation for the Japanese language can be judged by the lerner oneself.

According to the present invention, a self-learning apparatus for reading and writing of the japanese language can be provided in which any foreigner desired to learn reading and typing of the Japanese language can be learned from hearing a correct or standard pronunciation of the Japanese language reproduced on the record player or players in the device $a$; by providing the Japanese language identifying device with pronunciations for the Japanese language according to the learned manner, the Japanese kana-letters can be typed automatically according to the identified order; and correctness or incorrectness of the pronunciation for the Japanese language can be judged by comparing two Japanese kana-letters of which one is identified and typed automatically, and the other is typed manually.

Also, according to the present invention, a self-learning apparatus for the Japanese language of this kind can be provided which may be assisted by the use of a record player of said device $b$.

An object of the present invention is to provide an apparatus for self-learning of reading and typing of the Japanese language suitable for foreigners, by hearing a correct voiced sounds of the Japanese language and pronouncing Japanese language according to the learned manner, as well as by self-judging for correctness or incorrectness of the pronunciation for the Japanese language.

Another object of the present invention is to provide a self-learning apparatus for pronouncing and typing of the Japanese language in which correctness or incorrectness of pronunciation for the Japanese language can be judged by comparing two Japanese kana-letters.

The present invention will be better understood by those skilled in the art from the following specification and the accompanying drawings in which:

DESCRIPTION OF THE PREFERRED EMBODIMENT

Figure 1:
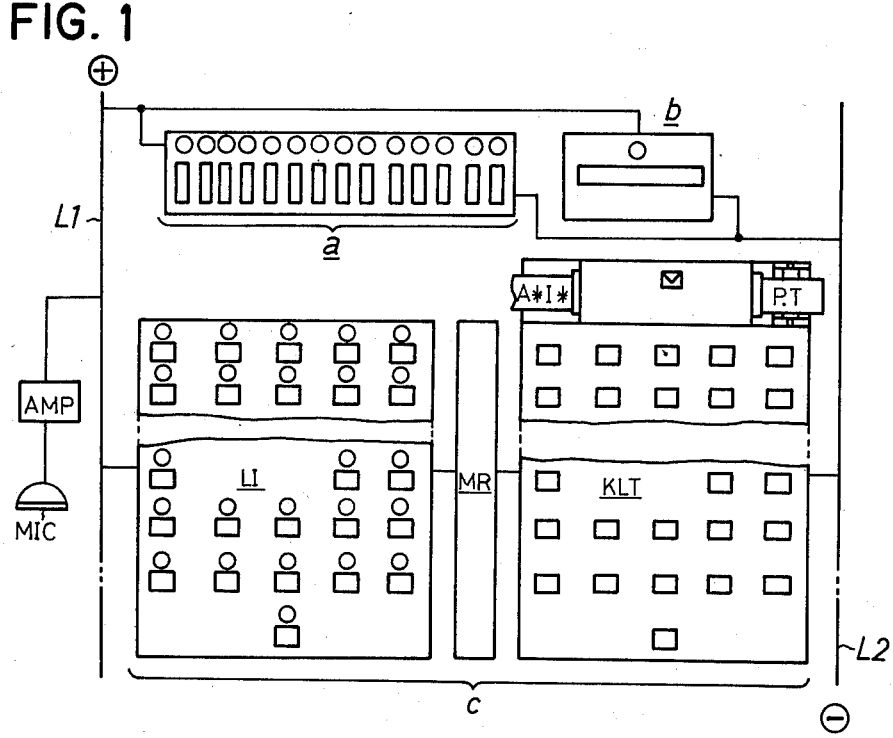
FIG. 1 is a block diagram of an electrical circuity of the apparatus of the present invention.

Referring now to FIG. 1, there is shown an apparatus embodying the present invention. Here a device $a$ serves Japanese language pronunciation, a device $b$ for learning words in foreign and Japanese languages and a device $c$ which identifies voiced sounds of the japanese language and operates the Japanese kana-letter typewriter automatically or manually.

The devices $a$ and $b$ are connected in parallel between the electric power supply-lines L1 and L2, the device $c$ is connected between the line L1 and L2 in parallel with the devices $a$ and $b$. A microphone MIC is connected to the line L1 through an amplifier AMP to provide Japanese voiced sounds to the device $c$.

The device $b$ composed of a translation learning device, may be eliminated for some embodiment of the present invention.

The device $c$ is composed of a Japanese language identifier LI, an electric-motor driven Japanese kana-letter typewriter KLT which is automatically or manually operated and types the Japanese kana-letters on a typing paper P.T, and a memory device MR connected between the identifier LI and the typewriter KLT.

Figure 2:
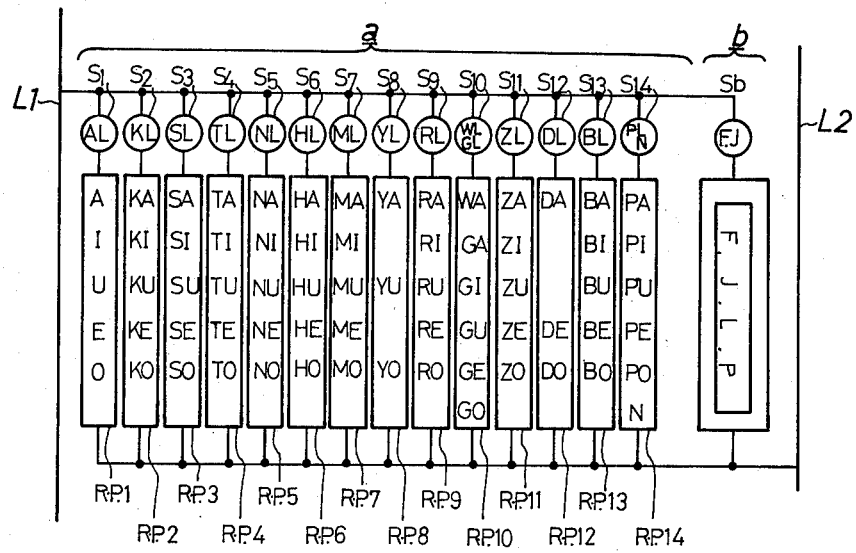
FIG. 2 is a schematic circuit diagram of the devices $a$ and $b$ shown in FIG. 1 for learning pronunciation of the Japanese language and wordings in the foreign and the Japanese languages.

In FIG. 2, an electric circuit for the devices $a$ and $b$ is shown. Here device $a$ comprises fourteen sets of magnetic tape-record-players R.P.1, R.P.2 - - - R.P. 14 and their operating push-button switches S1, S2 - - - S14 connected in series to said record players respectively. Each set composed of a record-player and its push-button switch is served substantially for one line of the words table W.T, and all sets are connected in parallel between the supply lines L1 and L2. Said record players and their push button switchs are arranged as follows:

The switch S1 and the record player R.P.1 are used for reproduction of vocal cords vibrating to produce the sounds of five vowels A, I, U, E and O belonging to the A line in the words table W.T, the switch S2 and the record player R.P.2 are used for reproduction of vocal cords vibrating to produce the sounds KA, KI, KU, KE and KO belonging to the KA line, and so on, each set of the puch-button switch and the record player is used for one line of the words table, except for lines WA, GA and PA, and for one word N, as shown in FIG. 2.

The switches S1 - - - S14 are marked with indicating marks for their incorporated record players respectively, for example on the switch S1 a mark AL is marked, on the switch S10, two marks WL and GL and on the switch S14, two marks PL and N are marked respectively, so as to make line selection of the Japanese language to be reproduced. For the sake of easy understanding about the description, the Japanese languages reproduced by the record players respectively, are indicated on each record player.

Said fourteen sets of record players and their push-button switchs may be replaced by one record player and its push-button switch (not shown in the drawing). In this case, all vocal cords vibrating sounds of the Japanese language will be recorded in one record player according to their line order, and a mark "HEARING" will be indicated on the push-button switch, as stated above.

The device $b$ described above comprises a record player F.J. R.P having recorded therein a Foreign and the corresponding Japanese wordings and its operating push-button switch S$b$ indicated with a mark F.J. This record player is formed preferably as a cassette-type record player exchangeable for a different wording.

Figure 3:
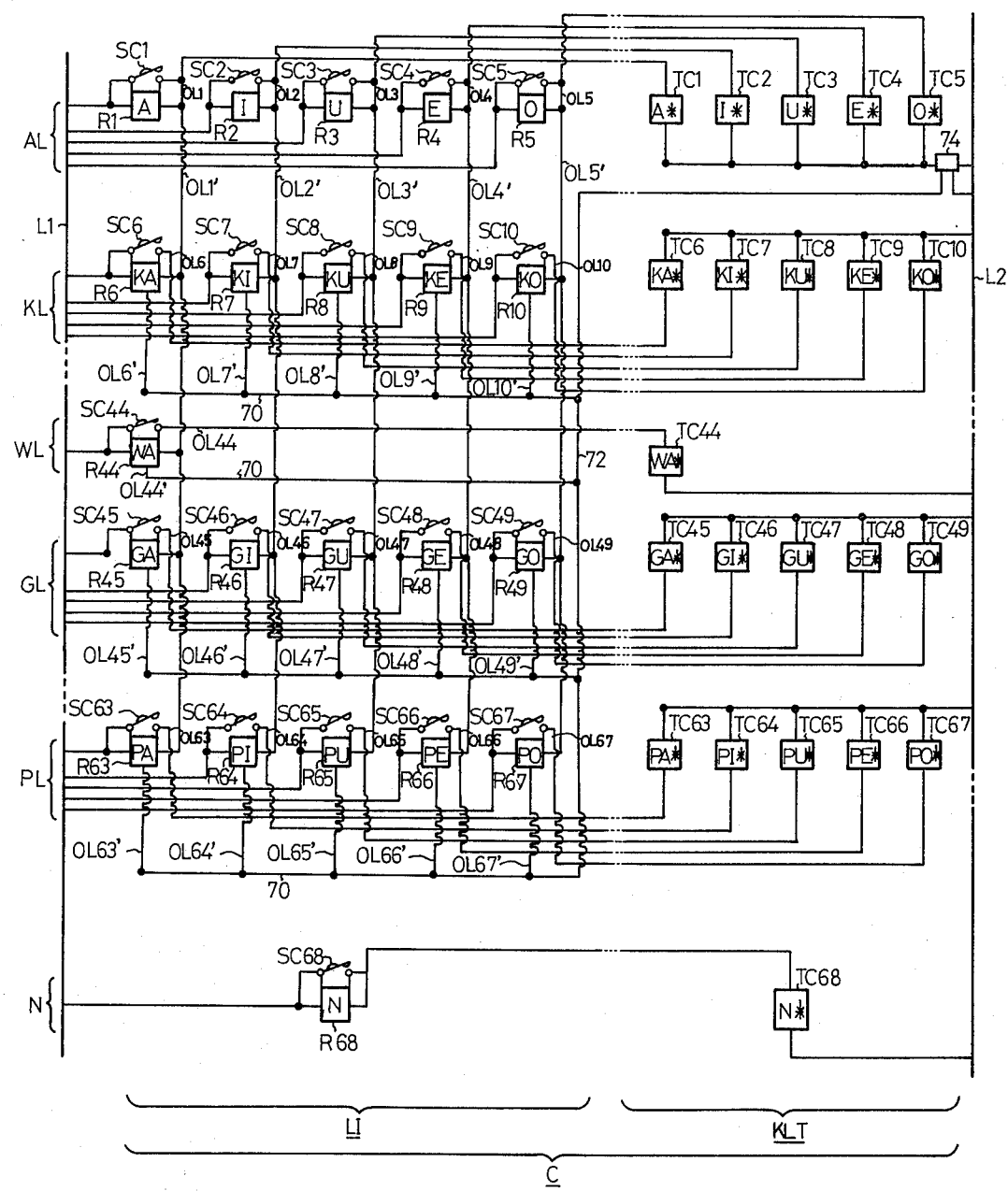
FIG. 3 is a partial circuit diagram of the device $c$ shown in FIG. 1.

FIG. 3 shows a partial electrical connection of the identifying device $c$.

The device $c$ is composed of a Japanese language identifier LI, an electric-motor driven Japanese kana-letter typewriter KLT and a memory device MR as shown in FIG. 1.

The identifier LI comprises sixty eight language identifying relays R1 - - - R5 - - - R68 for identifying or selecting one of said sixty eight Japanese vocal cords vibrating sounds supplied from the microphone MIC to the line L1, through the amplifier AMP.

In FIG. 3, some of the identifying relays and their associated typing coils of the typewriter are eliminated for the sake of simplicity of the drawing, because they are similar in their electrical connections to their related parts.

As shown in FIG. 3, the identifying relays R1 - - - R68 are provided with a short-circuiting push-button switch SC1 - - - SC5, SC6 - - - SC68 respectively. These push-button switchs are served for judging correctness or incorrectness of the learner's pronunciation for the Japanese language, their operation and effect will be described hereinafter.

As shown in the drawing, the identifying relays are indicated with marks A, I - - - O, KA, KI - - - KO - - - N respectively, to indicate a corresponding Japanese language sound to be identified by the respective relays. Therefore by performing the switch-in operation with a push-button switch, according to said marks for the relays, the same Japanese kana-letter as that which is typed through the operation of the identifying relay can be typed.

The electric-motor driven Japanese kana-letter typewriter KLT connected between the supply lines L1 and L2 in series with the identifier LI is of a type which is activated by a current passing through one of the identifying relays or is activated by its associated push-button switch. It types a Japanese kana-letter on the typing paper T.P (shown in FIG. 1) according to the operation of the identifying relay or in response to the short circuiting action of its associated push-button switch.

Electric-motor driven Japanese kana-letter typewriters have been known and used in Japan. According to the present invention, the typewriter is provided with sixty eight typing coils TC1 - - - TC68 to activate their associated types for the respective Japanese kana-letters. The coils are arranged in the key-board of the kana-letter typewriter and connected in series with the identifying relays of the identifier LI respectively, so as to be operated through the action of the identifying relays or their associated short circuiting push-button switchs respectively.

The Japanese kana-letters to be printed through operations of the typing coils TC1 - - - TC68 are shown by the respective English letters with the asterisks.

Identifying relays R1 - - - R68 are connected to the respective typing coils TC1 - - - TC68, as follows:

Output lines OL1 - - - OL5 with a normally opened terminal of the short-circuiting push-button switchs SC1 - - - SC5, are connected to respective typing coils TC1 - - - TC5 of the typewriter KET. Branched output lines OL1' - - - OL5' from the lines OL1 - - - OL5 are connected to respective input terminals of associated identifying relays R6 - - - R67 for receiving an identified current for a vowel.

Output lines OL6 - - - OL67 of the relays R6 - - - R67 are connected to typing coils TC6 - - - TC67 of the typewriter KLT respectively. Other output lines OL6' - - - OL67' conducting output currents produced respectively from identifications for consonants (voiceless and voiced consonants) are connected to their respective common lines 70 for each line of said words table W.T. These common lines are connected to another common line 72. A cut-out relay 74 is connected in the line 72 to cut-out a printing circuit line common to the typing coils TC1 - - - TC5 for five Japanese kana-letters for vowels, in response to the operation of one of said relays R6 - - - R67.

For a voiced sounds WA, an identifying relay R44 and a typing coil TC44 are used for typing of the Japanese kana-letter WA*.

For a nasal sounds "N" of the English language, an identifying relay R68 and a typing coil TC68 are used for typing of the Japanese kana-letter N*.

In FIG. 3, memory device MR shown in FIG. 1 is eliminated.

Push-button switchs S1 - - - S14, Sb and SC1 - - - SC68 may be formed to open after a pre-determined time of their closure.

According to the present invention, a self-learning apparatus suitable to foreigners for self-learing of pronunciation and typing of the Japanese language can be provided in which pronunciation of the Japanese language described in the words table can be learned from hearing of the language reproduced on the record players R.P.1 - - - R.P.14, by selective operation of their push-button switchs. When desired, wordings of the foreign and the corresponding Japanese language can be learned from the record player F.J.L.P. operated by a switch Sb. Pronunciation and typing of the Japanese language can be learned by supplying voiced sounds to the device LI to be identified therein and typing identified language in the Japanese kana-letters by the typewriter KLT; and correctness or incorrectness of the learner's pronunciation can be judged by the learner oneself, by comparing two Japanese kana-letters which must be in the same syllabic character and one of which is automatically identified and typed on one hand with the another one which is typed by manual operation for the short-circuiting push-button switch associated to the corresponding identifying relay.

What is claimed is:

1. A self-learning apparatus for reading and writing of the Japanese language comprising; a record-playing device having recorded therein vowels and consonants of the Japanese language; an identifying device coupled to said record-playing device and provided with an identifier having identifying relays for automatically identifying vocal cords vibrating sounds of vowels and consonants of the Japanese language provided thereto; an electric motor-driven Japanese kana-letter typewriter having typing coils connected to said relays respectively, for automatically typing said identified vowels and consonants in the Japanese kana-letters and short-circuiting push-button switches connected to said identifying relays respectively, to operate said typewriter independent of said identifying relays.

2. A self-learning apparatus for reading and writing of the Japanese language of claim 1, wherein said pronunciation learning device is formed of 14 record players having recorded therein 68 vocal cords vibrations representing sounds of the Japanese language divided into fourteen groups and their respective operating push-button switches; said identifier having 68 ones of said identifying relays, the number of short circuiting push-button switches being 68 and said electric-motor driven Japanese kana-letter typewriter having 68 typing coils.

3. A self-learning apparatus for reading and writing of the Japanese language of claim 2, wherein said operating push-button switches are marked with marks indicating substantially one line of the Japanese language to be reproduced on the record players respectively.

4. A self-learning apparatus for reading and writing of the Japanese language of claim 1, wherein said pronunciation learning device is formed of a single recording device having recorded therein 68 vocal cords vibrations collectively representing sounds of the Japanese language, and an operating switch for actuating a hearing function.

5. A self-learning apparatus for reading and writing of the Japanese language of claim 1, further comprising a device for translation from a wording in a foreign language into a wording in the Japanese language.

6. A self-learning apparatus for reading and writing of the Japanese language of claim 5, werein the pronunciation learning device and the translation learning device are connected in parallel between the electric power supply lines, and the automatically identifying and typing device is connected in parallel to said devices between said electric power supply lines.

7. A self-learning apparatus for reading and writing of the Japanese language of claim 1, wherein a microphone is connected to the power supply line through an amplifier.

* * * * *